United States Patent
Yasui et al.

[15] 3,678,018

[45] July 18, 1972

[54] SULFUR-CURABLE OLEFINIC COPOLYMERS AND METHOD FOR PRODUCING THE SAME

[72] Inventors: Seimei Yasui, Takatsuki-shi; Masaaki Hirooka, Ibaragi-shi; Teruo Oshima, Nishinomiya-shi, all of Japan

[73] Assignee: Sumitomo Chemical Company, Ltd., Osaka, Japan

[22] Filed: Feb. 10, 1969

[21] Appl. No.: 798,121

[30] Foreign Application Priority Data

Feb. 20, 1968 Japan.....................................43/10961

[52] U.S. Cl. ....................260/80.78, 260/88.2 R, 260/79.5 B
[51] Int. Cl. ..........................................................C08f 15/40
[58] Field of Search.....................................260/88.2, 80.78

[56] References Cited

UNITED STATES PATENTS 3,527,739   9/1970   Valvassori ..........................260/80.78

Primary Examiner—James A. Seidleck
Assistant Examiner—Roger S. Benjamin
Attorney—Stevens, Davis, Miller & Mosher

[57] ABSTRACT

A sulfur-curable olefinic copolymer consisting essentially of
1. at least one 2-norbornene compound having at the fifth position of the norbornene nucleus a hydrocarbon group containing at least 3 to 200 acyclic and non-conjugated carbon-carbon double bonds, and
2. at least one member selected from the group consisting of ethylene and $\alpha$-olefin having three to 20 carbon atoms.

This sulfur-curable olefinic copolymer has excellent co-curability with a diene rubber and produced by contacting said 2-norbornene component and ethylene and/or said $\alpha$olefin with a catalyst consisting essentially of an organoaluminum compound and a member selected from the group consisting of a vanadium compound having at least trivalencies and a titanium compound having at least trivalencies.

13 Claims, No Drawings

SULFUR-CURABLE OLEFINIC COPOLYMERS AND METHOD FOR PRODUCING THE SAME

This invention relates to sulfur-curable olefinic copolymers and a method for producing the same, and more particularly sulfur-curable olefinic copolymer using a norbornene compound having a polyenic side chain at the fifth position of the norbornene ring and a method for producing the same.

Many attempts have been heretofore made to make an olefinic sulfur-curable copolymer by copolymerizing ethylene and $\alpha$-olefins with a norbornenic diene compound. As such, a norbornene compounds, there are known, for example, dicyclopentadiene, methylnorbornadiene, methylenenorbornene, and ethylidenenorbornene. An elastomer represented by an ethylene-propylene terpolymer containing such a norbornene compound as the third component has the serious drawback of poor co-curability with a diene rubber, for example, natural rubber, polyisoprene, polybutadiene or styrene-butadiene rubber (hereinafter abbreviated as SBR). Further, said terpolymer has other drawbacks, such as poor tackiness.

Recently, an ethylene-propylene terpolymer having a cure rate almost equal to that of SBR has been obtained by using ethylidenenorbornene as the third component. However, even the ethylene-propylene-ethylidenenorbornene terpolymer has not had a satisfactory co-curability with the diene rubber, and further it has been difficult to obtain a terpolymer having a satisfactory co-curability with SBR or natural rubber unless the concentration of the norbornenic diene compound is considerably enhanced. However, employment of high concentration of norbornenic diene compound tends to result in gel formation, and thus the occurrence of such gelation results in a serious drawback to their application. Furthermore, the properties required for an elastomer are greatly impaired, because such a bulky, cyclic structure of the norbornene compound restricts the flexibility of the main chain of the terpolymer. Still furthermore, use of a large amount of an expensive norbornene compound is also economically disadvantageous.

On the other hand, use of aliphatic diene compounds has been taken into account to overcome these disadvantages, but these diene compounds have considerably low copolymerizability with ethylene or propylene, and it has been very difficult to obtain a satisfactory iodine number.

The present inventors have found that a 2-norbornene compound having at the fifth position of the norbornene nucleus a hydrocarbon group containing at least two acyclic and non-conjugated carbon-carbon double bonds possesses an excellent copolymerizability with ethylene and propylene and the obtained copolymer has an excellent co-curability with SBR or natural rubber. Further the present inventors have recognized that, even in a copolymer of a high iodine number, gel formation proceeds with much difficulty, as compared with the conventional norbornenic ethylenepropylene rubber. Further, the thus obtained copolymer has excellent physical properties required for the elastomer and a high tackiness.

Accordingly, an object of the present invention is to provide a sulfur-curable olefinic copolymer having an excellent co-curability with a diene rubber.

Another object of the present invention is to provide a process for producing a sulfur-curable olefinic copolymer having an excellent co-curability with a diene rubber.

Other objects of the present invention will be apparent from the following description.

In order to accomplish these objects, the present invention provides a sulfur-curable olefinic copolymer consisting essentially of 1. at least one 2-norbornene component selected from the group consisting of (a) a 2-norbornene compound having at the fifth position of the norbornene nucleus a hydrocarbon group containing at least two acyclic and non-conjugated carbon-carbon double bonds, (b) a product obtained by reaction of a 2-norbornene compound having at the fifth position of the norbornene nucleus a halogen or a halogenated hydrocarbon group with a conjugated diene and an alkali metal or an organoalkalimetal compound, and (c) a product obtained by reaction of a 2-norbornene compound having at the fifth position of the norbornene nucleus a halogen or a halogenated hydrocarbon group with an acyclic polyene having an alkali metal at the terminal position thereof, and 2. at least one member selected from the group consisting of ethylene and $\alpha$-olefin having three to 20 carbon atoms.

Further the present invention provides a process for producing a sulfur-curable olefinic copolymer, which comprises contacting 1. at least one 2-norbornene component selected from the group consisting of (a) a 2-norbornene compound having at the fifth position of the norbornene nucleus a hydrocarbon group containing at least two acyclic and non-conjugated carbon-carbon double bonds, (b) a product obtained by reaction of a 2-norbornene compound having at the fifth position of the norbornene nucleus a halogen or a halogenated hydrocarbon group with a conjugated diene and an alkali metal or an organoalkalimetal compound, and (c) a product obtained by reaction of a 2-norbornene compound having at the fifth position of the norbornene nucleus a halogen or a halogenated hydrocarbon group with an acyclic polyene having an alkali metal at the terminal position thereof, and 2. at least one member selected from the group consisting of ethylene and $\alpha$-olefin having three to 20 carbon atoms, with a catalyst derived, as essential constituents, from an organoaluminum compound and at least one member selected from the group consisting of a vanadium compound and a titanium compound, both the vanadium atom and the titanium atom having at least trivalencies.

The 2-norbornene component used in the present invention has a hydrocarbon group at the fifth position of the norbornene nucleus, and the hydrocarbon group contains at least two acyclic and non-conjugated double bonds. Thus, the hydrocarbon group contains a linear portion of at least 5 carbon atoms. The number of the double bonds in the hydrocarbon group is not specifically limited, but it is generally two to 200, preferably two to 20. When co-curability is especially taken into account, the hydrocarbon groups having at least three, particularly at least four double bonds are frequently used.

The double bonds in such a polyenic chain can be of any type such as vinyl, vinylidene or vinylene type. Particularly, the polyenic chain may be a hydrocarbon group derived from an oligomer of butadiene or isoprene, or a co-oligomer of butadiene or isoprene with styrene or other hydrocarbons. Of course, any other unsaturated hydrocarbon groups can be used in the present invention. Further, hydrocarbon groups which are bonded by another norbornene nucleus at the terminals may be used in the present invention.

The norbornene compounds having these hydrocarbon groups can be prepared in any manner. For example, such a norbornene compound can be synthesized by Diels-Alder reaction of an acyclic polyene having desired length of chain and number of double bonds with cyclopentadiene. Or, the desired norbornene compound can be synthesized by Wurtz reaction of a norbornene compound having a halogen or halogenated hydrocarbon group at the fifth position with an acyclic polyene having sodium atom at the terminal. Or, the desired norbornene compound can be synthesized by dehydrohalogenation of a 2-norbornene having at the fifth position thereof a polyhalogenated hydrocarbon group.

Particular examples of norbornene compound used in the present invention include compounds represented by the following general formulae,

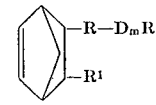

(I)

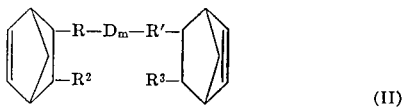

(II)

wherein D represents a dienic hydrocarbon residue; $D_m$ represents its m-mer and m is an integer larger than one; R and R' represent hydrocarbon residual groups or D; and $R^1$, $R^2$ and $R^3$ represent hydrogen atoms or hydrocarbon groups.

Further, even a mixture of norbornene compounds represented by the general Formula (I) or (II) having different dienic hydrocarbon residue of D, or even a mixture of norbornene compounds represented by the general Formulae (I) and (II), or a mixture of norbornene compounds represented by the general Formula (I) or (II) having different m-mers can be used in the present invention as the norbornene compound.

An oligomer of an aliphatic diene having three to 20 carbon atoms is preferable as D. For example, norbornene compounds having an oligomer of butadiene, isoprene or piperylene as a side chain are preferably used in the present invention. Further, any mode of addition can be used for polymerizing dienes. For example, any type of linkage of dienes: 1,4-addition, 1,2-addition or 3,4-addition is available. The oligomer synthesized by using a metallic sodium consists mainly of 1,2- or 3,4-addition polymers, and the oligomer synthesized by using a combination of a compound of transition metal of group IV–VIII of the Periodic Table and an organoaluminum compound consists mainly of 1,4-addition polymers. Furthermore, the norbornene compound having an oligopolymer of non-conjugated diene, such as 1,4-hexadiene, as a side chain, can be effectively used in the present invention.

The $\alpha$-olefin used in the present invention is represented by the general formula, $CH_2 = CH \cdot R''$, where $R''$ represents a hydrocarbon group having 1 to 18 carbon atoms. $\alpha$-Olefins having an alkyl, aryl, aralkyl, alkylaryl or cycloalkyl group, particularly an alkyl group as $R''$ are preferable. More concretely, the $\alpha$-olefin used in the present invention includes propylene, butene-1, pentene-1, 3-methyl-butene-1, hexene-1, 3-methyl-pentene-1, 4-methyl-pentene-1, heptene-1, 4-methyl-hexene-1, 5-methyl-hexene-1, 4,4-dimethyl-pentene-1, octene-1, 4-ethyl-hexene-1, 4-methyl-heptene-1, 5-methyl-heptene-1, 4,4-dimethyl-hexene-1, 6-methyl-heptene-1, 5,6,6-trimethyl-heptene-1, decene-1, 2-ethyl-hexene-1, octadecene-1, styrene, p-methyl-styrene, 2-vinyl-naphthalene, vinylcyclopentane, and vinylcyclohexane. Among these $\alpha$-olefins, such lower alkenes as propylene and butene-1 are frequently used.

As an organoaluminum compound used in the present invention, any organoaluminum compound capable of producing a polymerization activity when combined with vanadium compound or titanium compound can be used, but an organoaluminum compound as represented by the general formula, $AlR'''{}_nX_{3-n}$, is particularly preferable, where $R'''$ represents a hydrocarbon group having one to 20 carbon atoms; X represents a halogen; and n is 1, 1.5, 2 or 3. Examples of the hydrocarbon group of $R'''$ include alkyl, alkenyl, aryl, aralkyl, alkylaryl or cycloalkyl group, which is preferably methyl, ethyl, propyl, butyl, hexyl, oxtyl, decyl, dodecyl, stearyl, phenyl, toluyl, naphthyl, benzyl, cyclopentadienyl, cyclohexyl or groups derived therefrom. More concretely, the organoaluminum compound used in the present invention includes methylaluminum dichloride, ethylaluminum dichloride, isobutylaluminum dichloride, ethylaluminum dibromide, allylaluminum dichloride, vinylaluminum dichloride, ethylaluminum sesquichloride, methylaluminum sesquichloride, methylaluminum sesquibromide, ethylaluminum sesquiiodide, isobutylaluminum sesquichloride, hexylaluminum sesquichloride, cyclohexylaluminum sesquichloride, diethylaluminum chloride, diethylaluminum bromide, dipropylaluminum chloride, didodecylaluminum chloride, diethylaluminum fluoride, ethylphenylaluminum chloride, trimethylaluminum, triethylaluminum, tripropylaluminum, triisobutylaluminum, trihexylaluminum and tridecylaluminum. Further, a mixture of these compounds or a mixture of these compounds with such an aluminum halide as aluminum chloride, aluminum bromide, or aluminum iodide can be used in the present invention. Generally, an organoaluminum compound having a halogen is effectively used in the present invention.

Another component of the catalyst used in the present invention is a vanadium compound or titanium compound having at least trivalencies and includes all the compounds capable of producing a polymerization activity when used in combination with said organoaluminum compound. When the vanadium or titanium compound is used in the polymerization reaction in combination with the organoaluminum compound, a part or most part of the vanadium or titanium compound is reduced to form active sites, and at the same time these compounds may sometimes take lower valencies than trivalencies. The vanadium or titanium compounds having halogen atoms or such groups as alkoxy, acylacetonyl, cyclopentadienyl, acyloxy or inorganic acid group, or other chelating compounds or complex compounds can be effectively used in the present invention. The vanadium and titanium compound include vanadium tetrachloride, vanadium trichloride, vanadyl trichloride, vanadyl tribromide, vanadyl dichloride, vanadium triacetylacetonate, vanadyl chloride diacetylacetonate, vanadyl dichloride monoacetylacetonate, vanadyl diacetylacetonate, dicyclopentadienyl vanadium dichloride, triethyl orthovanadate, triamyl orthovanadate, a reaction product of triamyl orthovanadate and di-n-butyl-phosphoric acid, vanadium phosphate, titanium tetrachloride, titanium trichloride, di-n-butoxytitanium dichloride and bis[diacetylacetonyltitanium] titanium hexachloride.

Though the present method is one for conducting polymerization based on a catalyst system consisting essentially of an organoaluminum compound and at least one member selected from the group consisting of vanadium compounds and titanium compounds as stated above, any other suitable compounds can be added to said catalyst system as the third component in the present invention, if required. These compounds include the ones capable of forming a coordinated compound, for example, with an organoaluminum compound or vanadium compound or titanium compound, or having other interaction, for example, amines, cyclic nitrogen compounds, acid amides, ethers, esters, ketones, aldehydes, compounds of such group Vb elements as phosphorus, arsenic, antimony and bismuth, or various chelating agents. Furthermore, these compounds include various oxidative compounds that are considered to have an effect upon prevention of the vanadium compounds or titanium compounds from excessive reduction by the organoaluminum compounds, for example, halogen, sulfur, metal halides, oxygen, nitro compounds, nitroso compounds, organic nitrates, nitrites, N-oxide compounds, P-oxide compounds, azo compounds, organic sulfides, disulfides, quinones, acid halides, etc. Even furthermore, these compounds can include reagents having a suitable function of controlling molecular weight, for example, hydrogen.

Though there is no specific limitation in the ratio of an organoaluminum compounds to at least one member selected from the group consisting of vanadium compounds and titanium compounds used in the present invention, a favorable result can be obtained at a ratio by mole of 1:1 through 10,000:1, particularly 2:1 through 300:1. In terms of concentrations in a reaction medium, the frequently employed concentration of at least one member selected from the group consisting of vanadium compounds and titanium compounds is 0.01 to 50 millimoles/l, particularly 0.1 to 5 millimoles/l. However, an excellent activity can be sometimes exhibited even in such a low concentration of less than 0.01 millimole/l, for example, about $10^{-4}$ millimole/l, depending upon the situation. The frequently employed concentration of the organoaluminum compound in the reaction medium is 0.1 to 100 millimoles/l, particularly 0.5 to 20 millimoles/l. Further, the suitable concentration of the norbornene compound in the reaction medium is 0.1 to 1,000 millimoles/l, particularly 1 to 50 millimoles/l, but is not limited thereto.

There is no specific limitation upon the order of addition of the catalyst components and monomers. The catalyst components and monomers can be added to the polymerization system in any manner. Generally speaking, a higher catalytic activity can be obtained when the catalyst components are separately added to the polymerization system in the presence of monomers than when a mixture of the catalyst components prepared in advance is added to the polymerization system. However, in view of the change with time in activity of the catalyst, better result can be sometimes obtained when a mixture of the catalyst components prepared in advance is used.

The monomer components, particularly norbornene compound, may be dissolved in the reaction medium in advance, or may be continuously or intermittently added to the polymerization system together with other monomers at the same time. Ratio of ethylene to α-olefin depends upon desired properties of the copolymer. In an ethylene-rich case, crystalline copolymers can be more readily formed in general. In order to prepare an amorphous elastomer, which is one of the objects of the present invention, it is necessary to avoid such excessively ethylene-rich conditions. Accordingly, it is preferable to feed, for example, not more than 85 percent by mole of ethylene to the polymerization system.

It is preferable that the norbornene compound is copolymerized so that the norbornene content of the main chain of the copolymer consisting of ethylene, α-olefin and norbornene compound may be 0.1 to 20 percent by mole, but the norbornene content is never limited thereto. The degree of unsaturation of the copolymer can be freely adjusted by the number of moles of the norbornene compound and the degree of unsaturation of the side chain. Generally, a copolymer having an iodine number of 5 to 350, particularly 10 to 150, is frequently used.

Thus, as the composition of desired terpolymer elastomer having excellent properties is suitable 5 to 95 percent by mole, preferably 5 to 85 percent by mole of ethylene, 5 to 95 percent by mole, preferably 20 to 95 percent by mole of propylene, and 0.1 to 20 percent by mole, preferably 0.1 to 10 percent by mole of 2-norbornene compound.

The polymerization reaction can be carried out under any pressure, for example, from a vacuum condition, or a condition diluted with other inactive gas, to a pressurized condition up to 100 kg/cm². Any polymerization temperature, for example, from such a low temperature as −78° C. to such an elevated temperature as +100° C., can be employed, but in general a temperature between −35° C. and 70° C. gives a favorable result to the polymerization reaction.

The polymerization reaction may be carried out in the absence of a solvent, for example, in liquefied monomers according to the present invention. An inactive reaction medium can be used in conducting the polymerization. The ordinary hydrocarbon compounds or halogenated hydrocarbon compounds are suitable as the inactive reaction medium. For example, the inactive reaction medium includes propane, butane, pentane, hexane, heptane, octane, petroleum ether, ligroin, or other petroleum solvent mixture, benzene, toluene, xylene, cyclohexane, methylcyclohexane, methylene dichloride, ethylene dichloride, trichloroethylene, tetrachloroethylene, butyl chloride, chlorobenzene, and bromobenzene.

After the polymerization reaction has been completed, the post treatment is carried out according to the ordinary procedure, whereby the resulting polymer can be purified and recovered. The ordinary post treatment includes alcohol treatment, alcohol-hydrochloric acid treatment, aqueous hydrochloric acid treatment, alkali treatment, aqueous emulsifier treatment, chelating agent treatment, or any other post treatment used in the polymerization based on the Ziegler-Natta catalyst. Or, the resulting solid polymer may be collected and recovered without any of these post treatments, for example, by salting out or direct removal of the solvent. Further, a stabilizer or other additive can be added to the polymer during or after these treatments.

The present invention is hereunder more concretely explained referring to Examples, but the present invention is not limited to these Examples.

EXAMPLE 1

One liter of heptane was placed in a separable flask having a capacity of 2 l, and a gaseous mixture of 40 percent by mole of ethylene and 60 percent by mole of propylene was fed to the flask held in a thermostat at 30° C. at a rate of 10 Nl/min. to saturate the heptane with the gaseous mixture. Then, 20 ml of n-heptane containing 4 millimoles of dissolved ethylaluminum sesquichloride (Al Et$_{1.5}$Cl$_{1.5}$), 20 ml of n-heptane containing 0.4 millimole of dissolved vanadyl trichloride, and 10 ml of n-heptane containing 1.6 g of 2-norbornene compound having at the fifth position isoprene oligomer in which isoprene is averagely dimerized in 1,2- and 3,4- addition were continuously added to the flask dropwise for 30 minutes to conduct polymerization, while said gaseous mixture of ethylene and propylene was fed to the flask with stirring. Then, 30 ml of methanol containing β-phenyl-naphthylamine was added to the flask to stop the polymerization, and the resulting reaction solution was poured into a large amount of methanol to deposit copolymers, whereby 13.7 g of white copolymers were obtained. The intrinsic viscosity measured in a xylene solution at 70° C. was 2.48 dl/g, and the iodine number was 5.6.

Press vulcanization was conducted at 160° C. for 40 minutes according to the following prescription. The vulcanized material had a tensile strength at break of 315 kg/cm², elongation of 480 percent and 300 percent modules at 160 kg/cm².

| | |
|---|---|
| Copolymer | 100 parts by weight |
| β-phenyl-naphthylamine | 1 |
| Stearic acid | 1 |
| Zinc oxide | 1 |
| HAF black | 50 |
| Sulfur | 1.5 |
| Tetramethylthiuram sulfide | 1.5 |
| Mercaptobenzothiazole | 0.5 |

EXAMPLE 2

One liter of tetrachloroethylene was placed in a separable flask having a capacity of 2 l, and a gaseous mixture of 40 percent by mole of ethylene and 60 percent by mole of propylene, and hydrogen were led at 25° C. to the flask at rates of 8 Nl/min. and 2 Nl/min. respectively to saturate the solution with the gases. Then, 2 g of 5-(3'-vinyl-6'-heptenyl)-2-norbornene, 8 millimoles of diethylaluminum chloride, and 0.4 millimole of triethyl orthovanadate were added thereto in this order while continuing to lead the gases thereto, and the copolymerization was conducted for 30 minutes. As a result, 12.3 g of copolymer having an iodine number of 10.8 was obtained. The thus obtained copolymer was vulcanized according to the same prescription as in Example 1, and the vulcanized material having a tensile strength of 195 kg/cm² was obtained.

EXAMPLE 3

A gaseous mixture of 40 percent by mole of ethylene and 60 percent by mole of propylene, and hydrogen were led to a separable flask at rates of 10 Nl/min. and 0.2 Nl/min. respectively in the same manner as in Example 1, and while 8 millimoles of ethylaluminum sesquichloride, 0.8 millimole of vanadyl trichloride and 8.0 g of 2-norbornene compound having at the fifth position of norbornene nucleus an oligomer of isoprene as a side chain and having a molecular weight of 542 were continuously added thereto, the copolymerization was conducted for 30 minutes. As a result, 26.3 g of terpolymer having an intrinsic viscosity of 1.62 dl/g and iodine number of 46.5 was obtained.

The thus obtained terpolymer was vulcanized at 150° C. for 10 minutes according to the same prescription as in Example 1, and a fairly good vulcanized material having a tensile strength of 244 kg/cm² and elongation of 280 percent was obtained.

The terpolymer obtained likewise by using dicyclopentadiene as a norbornene compound having an iodine number of 45 underwent gelation and a fairly good vulcanized material could not be obtained.

EXAMPLE 4

A gaseous mixture of 40 percent by mole of ethylene and 60 percent by mole of propylene, and hydrogen were led to heptane in a separable flask at rates of 10 Nl/min. and 0.5 Nl/min. respectively in the same manner as in Example 1, and while 6 millimoles of ethylaluminum sesquichloride, 0.6 millimole of vanadyl trichloride and 15 g of 5-alkapolyenyl-2-norbornene compound were continuously added thereto, the copolymerization was conducted at 30° C. for 30 minutes. The 5-alkapolyenyl-2-norbornene compound was prepared by reaction of 5-bromomethyl-2-norbornene with metallic sodium and isoprene, and had a mean molecular weight of 1,380. Said compound was a mixture of a norbornene compound bonded to one end of isoprene oligomer and norbornene compounds bonded to both ends of isoprene oligomer.

As a result of copolymerization, 32.6 g of terpolymer having an intrinsic viscosity of 1.61 dl/g and iodine number of 96.8 was obtained.

Vulcanization was conducted at 160° C. for 40 minutes according to the same prescription as in Example 1, and a vulcanized material having a tensile strength of 176 kg/cm², elongation of 380 percent, and 300 percent modulus of 134 kg/cm² was obtained.

What we claim is:

1. A sulfur-curable olefinic copolymer consisting essentially of
   1. at least one 2-norbornene compound having at the fifth position of the norbornene nucleus a hydrocarbon group containing 3 to 200 acyclic and non-conjugated carbon-carbon double bonds, and
   2. at least one member selected from the group consisting of ethylene and α-olefin having three to 20 carbon atoms.

2. A copolymer according to claim 1 wherein said 2-norbornene compound is produced by reaction of a 2-norbornene compound having at the fifth position of the norbornene nucleus a halogen or a halogenated hydrocarbon group with a conjugated diene and an alkali metal or an organoalkalimetal compound.

3. A copolymer according to claim 1 wherein said 2-norbornene compound is produced by reaction of a 2-norbornene compound having at the fifth position of the norbornene nucleus a halogen or a halogenated hydrocarbon group with an acyclic polyene having an alkali metal at the terminal position thereof.

4. A sulfur-curable amorphous olefinic copolymer according to claim 1, wherein the copolymer consists of 0.1 to 20 percent by mole of the 2-norbornene component, 5 to 95 percent by mole of ethylene, and 95 to 5 percent by mole of the α-olefin.

5. A sulfur-curable amorphous olefinic amorphous copolymer according to claim 1, wherein the copolymer consists of 0.1 to 10 percent by mole of the 2-norbornene component, 5 to 85 percent by mole of ethylene and 20 to 95 percent by mole of the α-olefin.

6. A sulfur-curable amorphous olefinic copolymer according to claim 1, wherein the side chain of the 2-norbornene component has a residue of a polymer of aliphatic conjugated diene compounds.

7. A sulfur-curable amorphous olefinic copolymer according to claim 1, wherein the α-olefin is propylene.

8. A method for producing a sulfur-curable olefinic copolymer, which comprises contacting
   1. at least one 2-norbornene compound having at the fifth position of the norbornene nucleus a hydrocarbon group containing 3 to 200 acyclic and non-conjugated carbon-carbon double bonds, and
   2. at least one member selected from the group consisting of ethylene and α-olefin having three to 20 carbon atoms, with a catalyst derived, as essential constituents, from an organoaluminum compound and at least one member selected from the group consisting of a vanadium compound and a titanium compound, both the vanadium atom and the titanium atom having at least trivalencies, wherein the ratio of the organoaluminum compound to at least one member selected from the group consisting of the vanadium compound and titanium compound is 1 : 1 through 10,000 : 1 by mole.

9. A method according to claim 8 wherein said 2-norbornene compound is produced by reaction of a 2-norbornene compound having at the fifth position of the norbornene nucleus a halogen or a halogenated hydrocarbon group with a conjugated diene and an alkali metal or an organoalkalimetal compound.

10. A method according to claim 8 wherein said 2-norbornene compound is produced by reaction of a 2-norbornene compound having at the fifth position of the norbornene nucleus a halogen or halogenated hydrocarbon group with an acyclic polyene having an alkali metal at the terminal position thereof.

11. A method according to claim 8, wherein the 2-norbornene component has at the fifth position of the norbornene nucleus a side chain having 3 to 200 carbon-carbon double bonds.

12. A method according to claim 8, wherein the organo-aluminum compound is a compound represented by the formula, $$Al\ R'''_n X_{3-n}$$

wherein R''' is a hydrocarbon group having one to 20 carbon atoms; X is a halogen atom; and $n$ is a number of 1, 1.5, 2 or 3.

13. A method according to claim 8, wherein the reaction is conducted at a temperature of from −78° to 100° C. under a pressure condition ranging from a vacuum to 100 kg/cm².

* * * * *